United States Patent
Ding et al.

(10) Patent No.: US 10,425,478 B2
(45) Date of Patent: Sep. 24, 2019

(54) TASK-BASED DATA TRANSMISSION METHOD AND DATA TRANSMISSION APPARATUS

(71) Applicant: Beijing Zhigu Rui Tuo Tech Co., Ltd, Beijing (CN)

(72) Inventors: Dayong Ding, Beijing (CN); Peng Lin, Beijing (CN); Hanning Zhou, Beijing (CN)

(73) Assignee: BEIJING ZHIGU RUI TUO TECH CO., LTD, Beijing (CN)

(*) Notice: Subject to any disclaimer, the term of this patent is extended or adjusted under 35 U.S.C. 154(b) by 295 days.

(21) Appl. No.: 15/116,821

(22) PCT Filed: Dec. 29, 2014

(86) PCT No.: PCT/CN2014/095278
§ 371 (c)(1),
(2) Date: Aug. 4, 2016

(87) PCT Pub. No.: WO2015/131639
PCT Pub. Date: Sep. 11, 2015

(65) Prior Publication Data
US 2017/0180474 A1    Jun. 22, 2017

(30) Foreign Application Priority Data

Mar. 3, 2014 (CN) .......................... 2014 1 0074531

(51) Int. Cl.
*G06F 16/27*    (2019.01)
*H04L 29/08*    (2006.01)

(52) U.S. Cl.
CPC .......... *H04L 67/1095* (2013.01); *G06F 16/27* (2019.01); *H04L 29/08* (2013.01)

(58) Field of Classification Search
CPC ................. H04L 67/1095; H04L 29/08; G06F 17/30575; G06F 17/30
See application file for complete search history.

(56) References Cited

U.S. PATENT DOCUMENTS 7,085,276 B1 * 8/2006 Heitmann ................. G06F 1/14
                                            370/395.4
8,838,776 B2 * 9/2014 Faist ..................... G05B 19/042
                                            709/224

(Continued)

FOREIGN PATENT DOCUMENTS

CN    1195820 A    10/1998
CN    1326145 A    12/2001

(Continued)

OTHER PUBLICATIONS

International Search Report for PCT Application No. PCT/CN2014/095278, dated Apr. 9, 2015, 2 pages.

*Primary Examiner* — Razu A Miah
(74) *Attorney, Agent, or Firm* — Amin, Turocy & Watson, LLP

(57) ABSTRACT

Task-based data transmission comprises, at a user end, sending a data synchronization request related to a task to a server end, wherein the data synchronization request comprises information about the task and a data synchronization strategy corresponding to the task, and receiving data corresponding to the data synchronization request that is returned by the server end. At the server end, a data synchronization request related to a task can be received by a requesting end. Data corresponding to the data synchronization request is determined, and then the requested corresponding data can be returned to the requesting end. Data related to a task currently to be done by a user is acquired from a server end by using a task-related data synchronization request, so that the user can quickly and flexibly (Continued)

virtualize a working environment of the user related to the task.

41 Claims, 7 Drawing Sheets

(56) References Cited

U.S. PATENT DOCUMENTS

| | | | | |
|---|---|---|---|---|
| 2002/0199001 A1* | 12/2002 | Wenocur | ............ | G06Q 10/107 709/227 |
| 2003/0041110 A1* | 2/2003 | Wenocur | ............ | G06Q 10/107 709/206 |
| 2003/0154309 A1* | 8/2003 | Kero | ............ | G06F 1/14 709/248 |
| 2004/0054750 A1* | 3/2004 | de Jong | ............ | H04L 29/06027 709/217 |
| 2006/0224775 A1* | 10/2006 | Lee | ............ | H04L 63/062 709/248 |
| 2007/0260751 A1* | 11/2007 | Meesseman | ............ | G06Q 10/109 709/248 |
| 2007/0288548 A1* | 12/2007 | Creamer | ............ | H04L 67/1095 709/202 |
| 2008/0033780 A1* | 2/2008 | Lee | ............ | G06Q 10/06 718/100 |
| 2008/0181260 A1* | 7/2008 | Vonog | ............ | G06F 1/14 370/519 |
| 2009/0077263 A1* | 3/2009 | Koganti | ............ | G06F 16/27 709/248 |
| 2009/0187622 A1* | 7/2009 | Xie | ............ | G06F 17/30581 709/203 |
| 2009/0198772 A1* | 8/2009 | Kim | ............ | H04L 67/1095 709/203 |
| 2010/0174773 A1* | 7/2010 | Penner | ............ | G06Q 10/10 709/203 |
| 2010/0183016 A1* | 7/2010 | Bonk | ............ | G06F 1/14 370/400 |
| 2012/0179653 A1* | 7/2012 | Araki | ............ | H04L 67/1095 707/634 |
| 2012/0179779 A1* | 7/2012 | Awasthi | ............ | H04L 67/1097 709/217 |
| 2012/0233490 A1* | 9/2012 | Barton | ............ | H04L 67/1095 713/503 |
| 2012/0296963 A1* | 11/2012 | Lu | ............ | H04W 84/00 709/203 |
| 2013/0007819 A1* | 1/2013 | Choi | ............ | H04N 7/147 725/88 |
| 2013/0060900 A1* | 3/2013 | Li | ............ | H04L 67/1095 709/217 |
| 2013/0138504 A1* | 5/2013 | Bookstaff | ............ | G06Q 30/0251 705/14.49 |
| 2013/0173808 A1* | 7/2013 | Yoon | ............ | H04L 41/00 709/226 |
| 2013/0212067 A1* | 8/2013 | Piasecki | ............ | G06F 17/30176 707/620 |
| 2013/0212420 A1* | 8/2013 | Lawson | ............ | G05B 19/4185 713/400 |
| 2013/0226876 A1* | 8/2013 | Gati | ............ | G06F 17/30079 707/652 |
| 2013/0268999 A1* | 10/2013 | Kiang | ............ | H04L 29/0854 726/4 |
| 2013/0332555 A1* | 12/2013 | Gabriel | ............ | H04L 67/1095 709/208 |
| 2014/0059001 A1* | 2/2014 | Baik | ............ | G06Q 10/06 707/610 |
| 2014/0085649 A1* | 3/2014 | Hohensee | ............ | G06F 3/1205 358/1.13 |
| 2014/0173230 A1* | 6/2014 | Smith | ............ | H04L 67/1095 711/162 |
| 2014/0201141 A1* | 7/2014 | Vibhor | ............ | H04L 29/0854 707/622 |
| 2015/0058287 A1* | 2/2015 | Zhang | ............ | G06F 17/30575 707/610 |

FOREIGN PATENT DOCUMENTS

| | | |
|---|---|---|
| CN | 101119512 A | 2/2008 |
| CN | 101778131 A | 7/2010 |
| CN | 102223416 A | 10/2011 |
| CN | 102447740 A | 5/2012 |
| CN | 103297495 A | 9/2013 |
| CN | 103581207 A | 2/2014 |
| CN | 103873567 A | 6/2014 |

\* cited by examiner

TASK-BASED DATA TRANSMISSION METHOD AND DATA TRANSMISSION APPARATUS

RELATED APPLICATION

The present application is a U.S. National Stage filing under 35 U.S.C. § 371 of international patent cooperation treaty (PCT) application No. PCT/CN2014/095278, filed Dec. 29, 2014, and entitled "TASK-BASED DATA TRANSMISSION METHOD AND DATA TRANSMISSION APPARATUS", which claims the benefit of priority to Chinese Patent Application No. 201410074531.5, filed on Mar. 3, 2014, which applications are hereby incorporated into the present application by reference herein in their respective entireties.

TECHNICAL FIELD

The present application relates to the field of data backups, and in particular, to a task-based data transmission method and data transmission apparatus.

BACKGROUND

To prevent loss of personal data, many technologies provide cloud backup services, that is, personal data of a user is uploaded and backed up to storage of a cloud; in the case of device replacement, the user can easily recover a working or use environment from the cloud backups; some cloud backup technologies can even cover applications installed on the device.

In many cases, a device of the user cannot be used because the user currently does not have the device or a temporary failure (such as power-off/arrears/technical failure) occurs, and at this time, if there are some urgent tasks to be processed, it is natural to think of borrowing a device of another around. However, general tasks rely on user data and the data is not stored in the device of others; because full backups of the user may often be up to tens of gigabytes (G), and most of the data may not be required for the user to complete the urgent tasks, it will be laborious to completely establish a virtual device from the cloud backups.

SUMMARY

An example objective of the present application is to provide a task-based data transmission technology.

In a first example aspect, the present application provides a task-based data transmission method, comprising:

sending a data synchronization request related to at least one task to a server end, wherein the data synchronization request comprises task information about the at least one task and a data synchronization strategy corresponding to the at least one task; and receiving data corresponding to the data synchronization request from the server end.

In a second example aspect, the present application provides a task-based server data transmission method, comprising:

receiving a data synchronization request related to at least one task from a requesting end;

determining data corresponding to the data synchronization request; and returning the data corresponding to the data synchronization request to the requesting end.

In a third example aspect, the present application further provides a task-based data transmission apparatus, comprising:

a communications module, configured to send a data synchronization request related to at least one task to a server end, wherein the data synchronization request comprises task information about the at least one task and a data synchronization strategy corresponding to the at least one task, wherein the communications module is further configured to receive data corresponding to the data synchronization request from the server end.

In a fourth example aspect, the present application further provides a server, comprising:

a communications module, configured to receive a data synchronization request related to at least one task from a requesting end; and a data confirmation module, configured to determine data corresponding to the data synchronization request, wherein the communications module is further configured to return the data corresponding to the data synchronization request to the requesting end.

In at least one of the various embodiments of the present application, data related to a task currently to be done by a user is acquired from a server end by using a data synchronization request related to the task, so that the user can quickly and flexibly virtualize a task-related working environment of the user, which is particularly applicable to a case in which the user needs to complete an urgent task on a temporary device. In addition, in the at least one of the various embodiments of the present application, a range and priority of required data is defined, so that acquisition of required data from the server end is quicker and more flexible.

BRIEF DESCRIPTION OF THE DRAWINGS

The disclosure will become more fully understood from the detailed description given herein below for illustration only, and thus are not limitative of the disclosure, and wherein.

DETAILED DESCRIPTION

The following describes various embodiments of the present application with reference to the accompanying drawings (a same reference sign in several drawings indicate a same element) and embodiments. The following embodiments are intended to describe the present application, rather than limiting the scope of the present application.

A person skilled in the art should understand that, the terms such as "first" and "second" in the present application are only used to distinguish different steps, devices, or modules, which neither represent any specific technical meaning nor represent a necessary logical order between them.

In the following description of the present application, the term "task" indicates matters that a user would like to deal with, such as handling an email, a short messaging service (SMS), and an Office-related file.

A user sometimes needs to complete one or more urgent tasks on a temporary device, and needs to acquire, from a server end (for example, a cloud), previously-backed-up data related to the task. Generally, when data is acquired from the server end, it is impossible to only acquire the data related to the task, but all backup data of the user on the server end is synchronized onto the temporary device, which wastes time of the user, and also occupies network and storage resources and the like.

Figure 1:
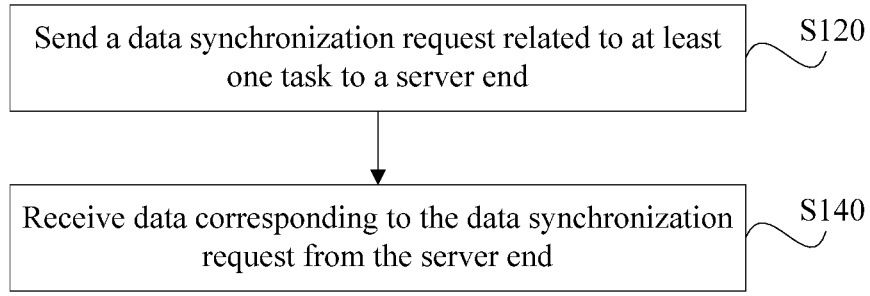
FIG. 1 is an example flowchart of a task-based data transmission method according to an embodiment of the present application.

Therefore, as shown in FIG. 1, an embodiment of the present application provides a task-based data transmission method, comprising:

S120: Send a data synchronization request related to at least one task to a server end, wherein the data synchronization request comprises task information about the at least one task and a data synchronization strategy corresponding to the at least one task.

S140: Receive data corresponding to the data synchronization request from the server end.

In this embodiment, the server end, for example, may be a cloud, which may comprise one server or multiple servers. Data previously backed up by a user is stored in the server end. In this embodiment, corresponding data is returned to the user according to the data synchronization request of the user, and content of the part will be further described hereinafter, and no further details are provided herein.

In this embodiment, the data synchronization request comprises the corresponding task information and the data synchronization strategy. For example, if a user wants to send an email to a contact A through a temporary device; at this time, the task is sending an email to the contact A, task information about the task may comprise: Task Type: Email, and the data synchronization strategy corresponding to the task comprises: a data synchronization range. In this embodiment, for example, an email directory of the user is classified into three groups, namely, family, colleague, and friend, and the contact A belongs to the group of colleague; therefore, the data synchronization range corresponding to a current data synchronization request comprises: all directories of the group of colleague. In addition, emails of the user may also be classified through time labels, for example, incoming and outgoing emails of the user are classified, according to time, into today's emails, emails within three days, emails within one week, and emails one week ago. A current task of the user is to see incoming and outgoing emails within three days; therefore, the data synchronization range corresponding to the current data synchronization request further comprises: incoming and outgoing emails of the user within three days.

As can be seen from the above, in this embodiment, the data corresponding to the data synchronization request and returned by the server end comprises: data of the incoming and outgoing emails of the user within three days and data of all contacts in the directories of the group of colleague. Task-related data of other emails, for example, data of contacts of the groups of family and friend and data of incoming and outgoing emails three days ago, is not transmitted. Therefore, with respect to the current task, the user can quickly obtain corresponding data, and perform task processing.

In a possible embodiment, when the user needs to acquire data corresponding to multiple tasks from the server end, the data synchronization strategy may possibly further comprise a data synchronization priority of data corresponding to each task.

For example, the user may need to first process a Word file I, and then send the processed Word file I to the contact A through an email. In this embodiment, the task of the user comprises: processing the Word file I and sending an email. In this embodiment, the user does not need to use a mailing function when processing the Word file I; therefore the user hopes to first acquire the Word file I, and then synchronizes email-related data when processing the Word file I. Therefore, in this embodiment, the data synchronization strategy further comprises: first transmitting data related to a Word file (for example, an Office file revised within one week), and then transmitting a data synchronization priority of the email-related data.

As can be seen from the above, by using the data transmission technology in the embodiment of the present application, a user can acquire required data from a server end more conveniently and quickly with respect to a task to be done, and further can quickly and flexibly virtualize a task-related working environment of the user, which is particularly applicable to an occasion in which the user needs to process an urgent task by using a temporary device.

The following further describes the steps of the method in the embodiment of the present application.

Figure 2:
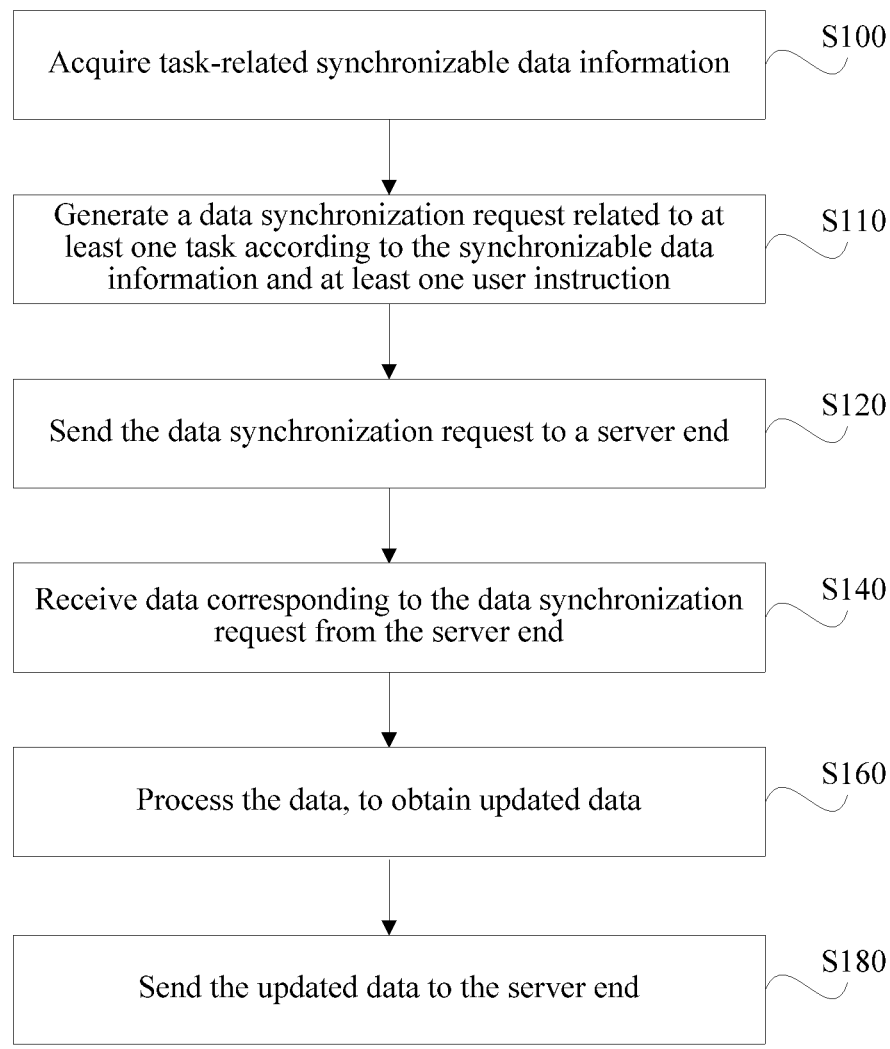
FIG. 2 is an example flowchart of another task-based data transmission method according to the embodiment of the present application.

As shown in FIG. 2, in a possible embodiment of the embodiment of the present application, before step S120, the method further comprises:

S100: Acquire task-related synchronizable data information

S110: Generate a data synchronization request related to at least one task according to the synchronizable data information and at least one user instruction.

In a possible embodiment, the acquiring task-related synchronizable data information is: receiving the task-related synchronizable data information sent by the server end. For example, the server end sends the synchronizable data information to a local device after the local device is connected to the server end.

In this embodiment, the synchronizable data information comprises task information about all synchronizable tasks, for example, task type information of the synchronizable tasks.

Optionally, in a possible embodiment of the embodiment of the present application, the synchronizable data information further comprises data attribute information respectively corresponding to the all synchronizable tasks.

In some embodiments, the data attribute information may comprise attribute information automatically recorded during creation, revising and other procedures of the data, for example, information about creation time, revising time, frequency of use, creator, sender, recipient and the like; in addition, the data attribute information may further comprise attribute information actively added to the data by the user, for example, the contact A of the emails is set to the most important contact.

In this embodiment, for the convenience of the user to quickly determine a range of to-be-acquired data, the data attribute information may comprise data classification information. For example, according to time information about data corresponding to a task, the data corresponding to the task is classified into three tiers, for example, the first tier corresponds to data updated within three days, the second tier corresponds to data updated within one week, and the third tier corresponds to all data corresponding to the task. Optionally, in some embodiments, the tiers of the data correspond to multiple data attributes, for example, for an email task, the first tier corresponds to: incoming and outgoing emails within three days, wherein recipients or senders of the incoming and outgoing emails are contacts in the group of colleague.

In some embodiments, the data classification information is default; and in some other embodiments, the user may define corresponding data classification information on its own, which comprises: the number of tiers the data is classified into, an attribute for classifying the data, and the like.

Optionally, in some possible embodiments, the synchronizable data information may not need to be acquired from the server end, but preset task-related synchronizable data information is acquired from a corresponding application of a local device, for example, there is default task-related synchronizable data information in a client of a local application.

S110: Generate a data synchronization request related to at least one task according to the synchronizable data information and at least one user instruction.

In a possible embodiment, the user performs one or more operations according to the synchronizable data information, to generate at least one user instruction and determine the at least one task and the data synchronization strategy.

Herein, the user instruction may comprise: selecting a first user instruction of the at least one task and determining a second user instruction of the data synchronization strategy corresponding to the at least one task.

Figure 3:
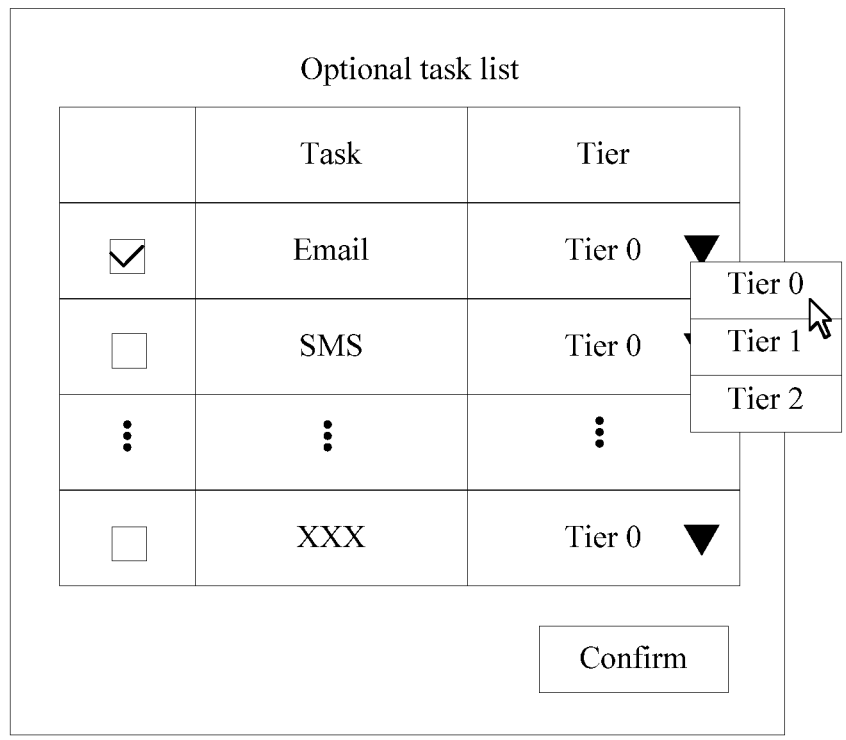
FIG. 3 is an example schematic diagram of synchronizable data information in the task-based data transmission method according to the embodiment of the present application.

FIG. 3 illustrates a possible embodiment of the synchronizable data information. In this embodiment, the synchronizable data information is presented in a form of an optional task list shown in FIG. 3. As can be seen from FIG. 3, task information (task type information: Email, SMS and the like) about synchronizable tasks and data attribute information corresponding to each task are listed in the optional task list. In this embodiment, the data attribute information is data classification information: Tier 0, Tier 1, and Tier 2. Table 1 shows a table of data classification information for tasks in this embodiment, and for each task, corresponding data is classified through a corresponding classification criterion.

TABLE 1

Table of data classification information for tasks

| Task | Classification criterion | Tier 0 | Tier 1 | Tier 2 |
| --- | --- | --- | --- | --- |
| Email/SMS | Sending/ receiving time | Within three days | Within two weeks | Within one month |
| Contact | Recently used | Recent 20 | Recent 40 | Recent 80 |
| Calendar event | Due date | Within three days | Within one week | Within one month |
| File | Opening time | Within three days | Within one week | Within one month |
| ... | | | | |

A person skilled in the art may know that, the classification criterion shown in Table 1 is a classification manner, and data corresponding to the tasks may also be classified by using another classification criterion, and no further details are provided herein.

For the optional task list shown in FIG. 3, the user generates, by clicking a select box before the task type information, the first user instruction for selecting the at least one task; the user generates the second user instruction by selecting a corresponding tier in a corresponding data classification information dropdown list after the selected task type information. The at least one task and a data synchronization range of each task can be confirmed according to the first user instruction and the second user instruction.

Optionally, in a possible embodiment of the embodiment of the present application, when data corresponding to multiple tasks needs to be synchronized, there are requirements for a synchronization sequence of the data corresponding to different tasks, and a third user instruction may be generated through another user operation, to determine the synchronization sequence. For example, in the optional task list shown in FIG. 3, data corresponding to a task at the top is synchronized first by default (for example, data corresponding to a task arranged at the top is synchronized before data corresponding to a task arranged at the bottom). The third user instruction may be generated by the user by moving data requiring synchronization most to the top.

At this time, a data synchronization strategy corresponding to the task is determined jointly by using the second user instruction and the third user instruction.

S120: Send a data synchronization request related to at least one task to a server end.

In this embodiment, after the data synchronization request is obtained according to the at least one task to be done and the corresponding data synchronization strategy, the data synchronization request is sent to the server end.

S140: Receive data corresponding to the data synchronization request from the server end.

After receiving the data synchronization request, the server end returns the data corresponding to the data synchronization request to a local device.

Optionally, in a possible embodiment, the method further comprises:

S160: Process the data, to obtain updated data.

Herein, the updated data is processed data corresponding to a related task, and the updated data may be data formed after revising, addition and/or deletion of the data originally received.

In this embodiment, the process of processing the data is a process of completing the corresponding task, for example, write an email and send the email.

In order to ensure that data backed up on the server end is latest data, in a possible embodiment, the method further comprises:

S180: Send the updated data to the server end.

In another possible embodiment of the embodiment of the present application, in order to implement the technical solution of the embodiment of the present application in a cross-platform and cross-application manner, the method further comprises:

between steps S140 and S160, converting the data from a first format to a second format.

Between steps S160 and S180, the method further comprises:

converting the updated data from the second format to the first format.

Herein, the first format is a unified exchangeable format, before corresponding data processing, the data in the first format is converted into data in a second format corresponding to a current application and platform, and after corresponding data in the second format is processed, data to be backed up is converted into data in the first format and then is backed up to the server end. In this case, it can be implemented that data can be flexibly used between different platforms and different applications. Especially when a temporary device used by the user and an application on the temporary device are different from a device previously used for backing up data, task processing may also be performed by using corresponding data without obstacles.

When the temporary device used by the user is a public device or a device of another person, in order to protect information security of the user and avoid data residue and leakage, in a possible embodiment, after step S180, the method further comprises:

receiving a confirmation notice corresponding to the updated data and returned by the server end; and deleting the data and the updated data.

After it is confirmed that the server end has received the updated data, data involved in the current task is automatically deleted, thereby avoiding privacy leakage and guaranteeing user information security; and at the same time, the owner of the temporary device does not need to worry about additional occupancy of device resources brought about by lending the device.

In addition, considering that the user lending the device may be concerned about leakage of his own private data, in a possible embodiment, the steps of the embodiment of the present application may be implemented in a visitor account environment. For example, a blank account on the temporary device is used, wherein the account provides applications installed on the device, which do not comprise any personal data (if such an account does not exist, you can create one), and the user can perform task processing through common applications (such as email and SMS applications) on the blank account and data received from the server end. In this way, the user lending the device does not need to worry about leakage of his own private data.

Figure 4:
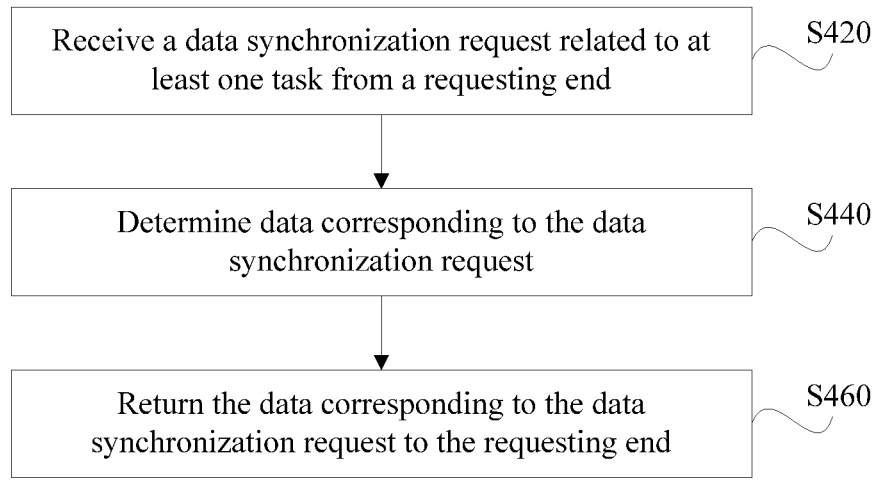
FIG. 4 is an example flowchart of a task-based server data transmission method according to an embodiment of the present application.

As shown in FIG. 4, a possible embodiment of an embodiment of the present application further provides a task-based server data transmission method, comprising:

S420: Receive a data synchronization request related to at least one task from a requesting end.

S440: Determine data corresponding to the data synchronization request.

S460: Return the data corresponding to the data synchronization request to the requesting end.

In this embodiment, the data synchronization request comprises task information about the at least one task and a data synchronization strategy corresponding to the at least one task. The data synchronization strategy comprises a data synchronization range corresponding to each task and/or a data synchronization priority corresponding to the at least one task. For further description of the data synchronization request, reference may be made to the corresponding description in the embodiment shown in FIG. 1 and FIG. 2, and no further details are provided herein.

When the data synchronization strategy comprises the data synchronization priority corresponding to the at least one task, step S460 further comprises: returning the data corresponding to the data synchronization request to the requesting end according to the data synchronization priority corresponding to the at least one task. For example, when the data synchronization request is related to two tasks: an email and a Word file, and as described in the embodiment shown in FIG. 1 and FIG. 2, the data synchronization strategy comprises the data synchronization priority: first transmitting data related to the Word file, and then transmitting data related to the email; therefore, in step S460, data related to the Word file is transmitted first, for example, Office files revised within one week; and then data related to the email is transmitted, for example, data of incoming and outgoing emails within three days.

As can be seen from the above, in the foregoing embodiment of the embodiment of the present application, corresponding data is determined according to a task-related data synchronization request, and then the data is returned to the requesting end. Therefore, the requesting end can conveniently and quickly acquire required data from the server end, so as to quickly and flexibly virtualize a task-related working environment of the user, which is particularly applicable to an occasion in which the user needs to process an urgent task by using a temporary device.

The steps of the method in this embodiment are further described through the following embodiment.

S440: Determine data corresponding to the data synchronization request.

Herein, in step S440, data related to a corresponding task and a range of the data are determined according to task information and a data synchronization strategy that correspond to the data synchronization request.

In this embodiment, the data corresponding to the data synchronization request is determined by using a task-related data index.

After the data synchronization request from the requesting end is received, corresponding data is acquired by using the task-related data index according to the task information and the data synchronization strategy that are comprised in the data synchronization request.

In a possible embodiment, the task-related data index is an existing data index; when such a data index does not exist, in another possible embodiment, before the determining data corresponding to the data synchronization request, the method further comprises:

creating the task-related data index according to a task-related attribute of the data.

For example, the server end creates the task-related data index according to a type of the task, data attribute information of the task (for example, some time labels of the data and predefined data classification information) and the like.

Data corresponding to the task-related data synchronization request can be quickly determined by using such a task-related data index, thereby improving synchronization efficiency.

S460: Return the data corresponding to the data synchronization request to the requesting end.

In step S460, the data corresponding to the data synchronization request is sent to the requesting end according to the data synchronization priority corresponding to the data synchronization request. Certainly, when the data synchronization priority does not exist, corresponding data is returned to the requesting end according to a default sequence of the server.

In a possible embodiment, after step S460, the method further comprises:
 receiving updated data sent by the requesting end; and
 merging the updated data with local data.

In this way, data at the server end is the latest version, so that the user can acquire the data at any time. Data fusion is an existing technology, and no further details are provided herein.

In a possible embodiment, after the updated data is received, a confirmation notice corresponding to the updated data is further sent to the requesting end, to notify the requesting end that the updated data is received, so that the requesting end correspondingly processes local data, for example, deletes the local data or the like.

For the convenience of the user to determine the range of the data request, in a possible embodiment, before the receiving a data synchronization request, the method further comprises:
 sending task-related synchronizable data information to the requesting end.

The synchronizable data information comprises: task information about all synchronizable tasks and data attribute information respectively corresponding to the all synchronizable tasks.

The synchronizable data information is described in detail in the embodiment shown in FIG. 1 and FIG. 2, and no further details are provided herein.

A person skilled in the art may understand that, in the methods of the various embodiments of the present application, sequence numbers of the steps do not mean an execution sequence, the execution sequence of the steps should be determined according to functions and internal logic thereof, but should not pose any limitation to the implementation process of the specific implementations of the present application.

Figure 5:
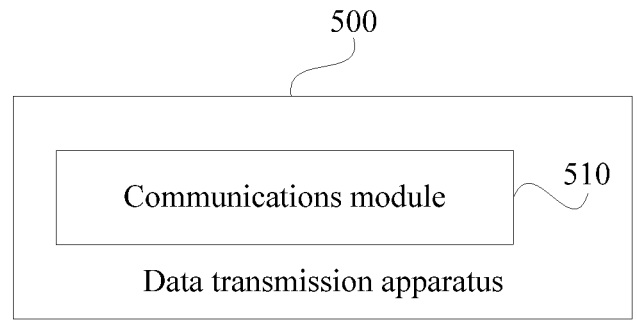
FIG. 5 is an example schematic structural diagram of a task-based data transmission apparatus according to an embodiment of the present application.

As shown in FIG. 5, an embodiment of the present application further provides a task-based data transmission apparatus 500, comprising:
 a communications module 510, configured to send a data synchronization request related to at least one task to a server end, wherein the data synchronization request comprises task information about the at least one task and a data synchronization strategy corresponding to the at least one task, wherein
 the communications module 510 is further configured to receive data corresponding to the data synchronization request and returned by the server end.

In this embodiment, the data transmission apparatus 500 sends the data synchronization request related to at least one task to the server end, wherein the data synchronization request defines a task corresponding to to-be-acquired data and a data synchronization strategy, particularly a data synchronization range. For more detailed description of the data synchronization request, reference may be made to the corresponding description in the embodiment shown in FIG. 1 and FIG. 2, and no further details are provided herein.

By using the data transmission apparatus 500 in the embodiment of the present application, a user can more conveniently and quickly acquire required data from the server end with respect to a task to be done, so as to quickly and flexibly virtualize a task-related working environment of the user, which is particularly applicable to an occasion in which the user needs to process an urgent task by using a temporary device.

The following further describes modules of the data transmission apparatus 500 in the embodiment of the present application.

Figure 6:
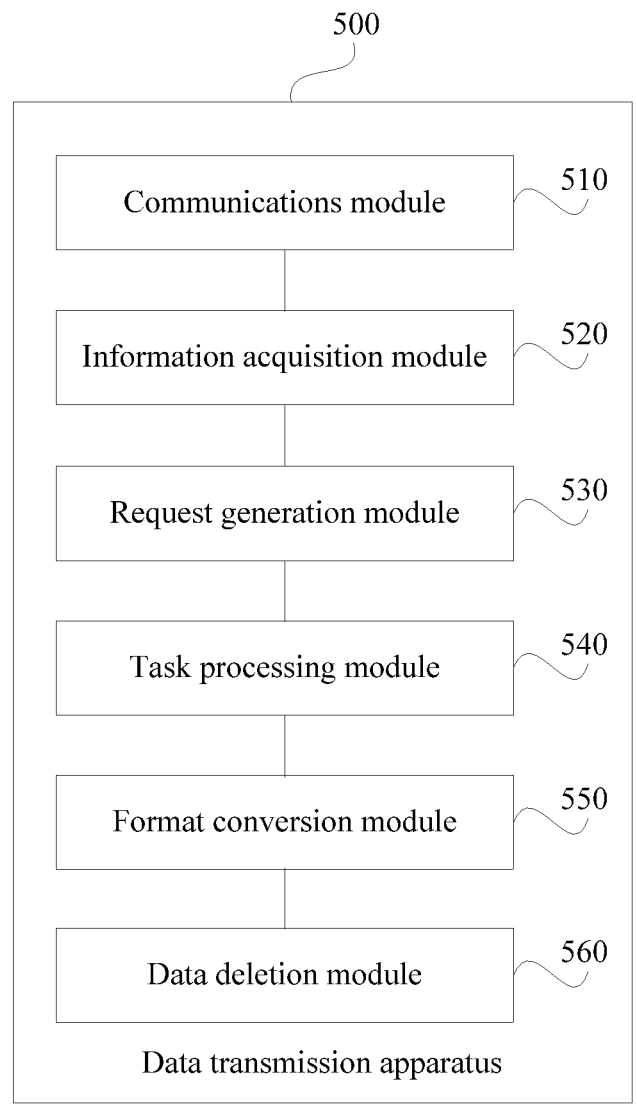
FIG. 6 is an example schematic structural diagram of another task-based data transmission apparatus according to an embodiment of the present application.

As shown in FIG. 6, in a possible embodiment, in addition to the communications module 510, the apparatus 500 further comprises:
 an information acquisition module 520, configured to acquire task-related synchronizable data information, wherein the synchronizable data information comprises task information about all synchronizable tasks; and
 a request generation module 530, configured to generate the data synchronization request according to the synchronizable data information and at least one user instruction.

In a possible embodiment, the information acquisition module 520 may acquire the task-related synchronizable data information by receiving synchronizable data information sent by the server end, and in this embodiment, the information acquisition module 520 and the communications module 510 may be the same module.

In another possible embodiment, the information acquisition module 520 may acquire the synchronizable data information locally.

In a possible embodiment, the synchronizable data information comprises task information about all synchronizable tasks, for example, task type information of the synchronizable tasks.

Optionally, in a possible embodiment of the embodiment of the present application, the synchronizable data information further comprises data attribute information respectively corresponding to the all synchronizable tasks, wherein the data attribute information may comprise data classification information.

For the method in which the information acquisition module 520 acquires the synchronizable data information and for further description of the synchronizable data information, reference may be made to the corresponding description in the embodiment shown in FIG. 2, and no further details are provided herein.

The user performs one or more operations according to the synchronizable data information, to generate at least one user instruction, and the request generation module 530 determines the at least one task and the data synchronization strategy according to the synchronizable data information and the user instruction.

For further description about that the request generation module 530 generates the data synchronization request according to the synchronizable data information and at least one user instruction, reference may be made to the corresponding description in the embodiment shown in FIG. 2 and FIG. 3, and no further details are provided herein.

In a possible embodiment, to complete the corresponding task, the apparatus further comprises:
 a task processing module 540, configured to process the data, to obtain updated data.

Herein, the updated data is processed data corresponding to a related task, and the data may be data formed after revising, addition and/or deletion of the data originally received.

In this embodiment, the process of processing the data is a process of completing the corresponding task, for example, write an email and send the email.

To ensure that data backed up on the server end is latest data, in a possible embodiment, the communications module 510 is further configured to send the updated data to the server end.

In a possible embodiment, the apparatus 500 further comprises:

a format conversion module 550, configured to convert the data from a first format to a second format.

Herein, the first format is a unified exchangeable format; before corresponding data processing, the data in the first format is converted into data in a second format corresponding to a current application and platform; and after corresponding data in the second format is processed, data to be backed up is converted into data in the first format and then is backed up to the server end. Therefore, it can be implemented that data can be flexibly used between different platforms and different applications. Especially when a temporary device used by the user and an application on the temporary device are different from a device previously used for backing up data, task processing may also be performed by using corresponding data without obstacles.

When the data transmission apparatus 500 used by the user is a public device or a device of another person, in order to protect information security of the user and avoid data residue and leakage, in a possible embodiment, the communications module 510 is further configured to receive a confirmation notice corresponding to the updated data and returned by the server end; and the apparatus 500 further comprises a data deletion module 560, configured to delete the data and the updated data.

In this way, after confirming that the server end has received the updated data, the data deletion module 560 automatically deletes data involved in the task, thereby avoiding privacy leakage and guaranteeing user information security, and at the same time, an owner of the data transmission apparatus 500 does not need to worry about additional occupancy of device resources brought about by lending the device.

In addition, considering that the user lending the device may be concerned about leakage of his own private data, in a possible embodiment, the steps of the embodiments of the present application may be implemented through a visitor account environment; for details, refer to the corresponding description in the embodiment shown in FIG. 2.

In a possible embodiment, the data transmission apparatus 500 is a mobile terminal. The mobile terminal, for example, may be a mobile phone, a tablet computer, a notebook or the like.

Figure 7:
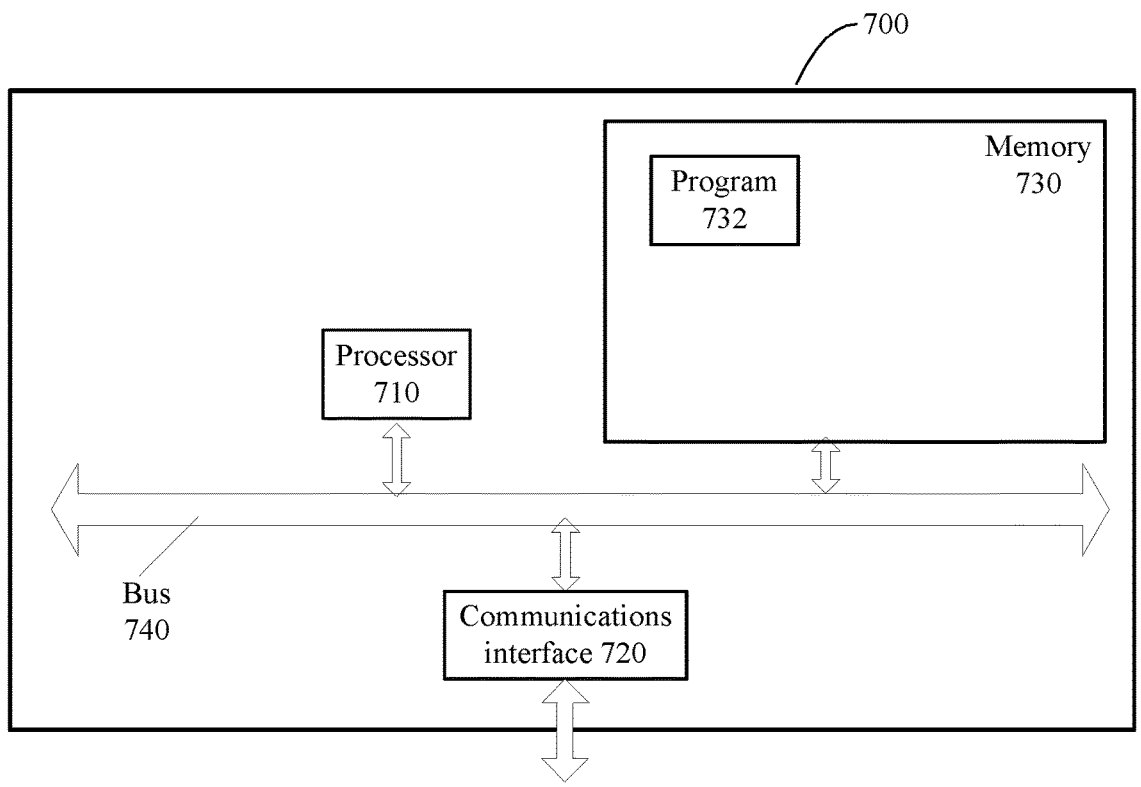
FIG. 7 is an example schematic structural diagram of still another task-based data transmission apparatus according to an embodiment of the present application.

FIG. 7 is a schematic structural diagram of another data transmission apparatus 700 according to an embodiment of the present application. Specific embodiments of the present application do not limit specific implementation of the data transmission apparatus 700. As shown in FIG. 7, the data transmission apparatus 700 may comprise:

a processor 710, a communications interface 720, a memory 730, and a communications bus 740.

The processor 710, the communications interface 720, and the memory 730 implement mutual communication by using the communications bus 740.

The communications interface 720 is configured to communicate with a network element such as a client.

The processor 710 is configured to execute a program 732, and specifically, may implement relevant steps in the method embodiments.

Specifically, the program 732 may comprise program code, wherein the program code comprises a computer operation instruction.

The processor 710 may be a central processing unit (CPU), or an application specific integrated circuit (ASIC), or one or more integrated circuits configured to implement the embodiment of the present application.

The memory 730 is configured to store the program 732. The memory 730 may comprise a high-speed random access memory (RAM), and may also comprise a non-volatile memory, for example, at least one magnetic disk memory. The program 732 may be specifically configured to enable the data transmission apparatus 700 to execute the following steps:

S120: Send a data synchronization request related to at least one task to a server end, wherein the data synchronization request comprises task information about the at least one task and a data synchronization strategy corresponding to the at least one task.

S140: Receive data corresponding to the data synchronization request and returned by the server end.

For specific implementation of each step in the program 732, reference may be made to the corresponding description in the corresponding steps and units in the foregoing embodiments, and no further details are provided herein.

Figure 8:
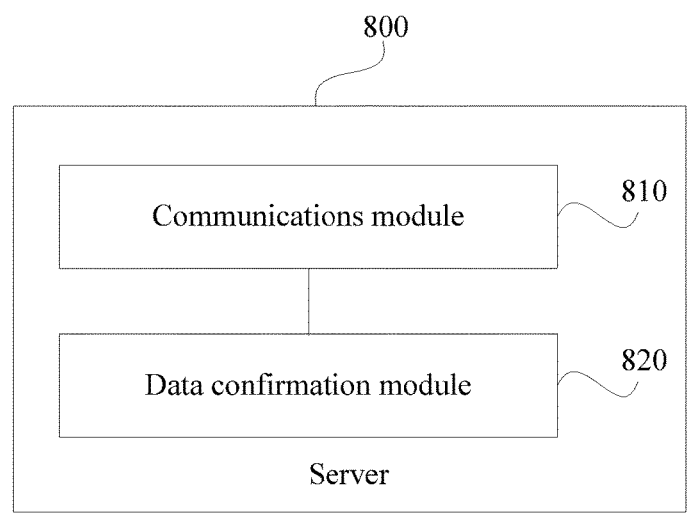
FIG. 8 is an example schematic structural diagram of a server according to an embodiment of the present application.

As shown in FIG. 8, an embodiment of the present application further provides a server 800, comprising:

a communications module 810, configured to receive a data synchronization request related to at least one task and sent by a requesting end; and a data confirmation module 820, configured to determine data corresponding to the data synchronization request, wherein the communications module 810 is further configured to return the data corresponding to the data synchronization request to the requesting end.

In this embodiment, the data synchronization request comprises task information about the at least one task and a data synchronization strategy corresponding to the at least one task. The data synchronization strategy comprises a data synchronization range corresponding to each task and/or a data synchronization priority corresponding to the at least one task. For further description of the data synchronization request, reference may be made to the corresponding description in the embodiment shown in FIG. 1 and FIG. 2.

When the data synchronization strategy comprises the data synchronization priority corresponding to the at least one task, the communications module 810 is further configured to return the data corresponding to the data synchronization request to the requesting end according to the data synchronization priority corresponding to the at least one task.

As can be seen from the above, in the foregoing embodiment of the embodiment of the present application, corresponding data is determined according to a task-related data synchronization request, and then the data is returned to the requesting end. Therefore, the requesting end can conveniently and quickly acquire required data from the server end, so as to quickly and flexibly virtualize a task-related working environment of the user, which is particularly applicable to an occasion in which the user needs to process an urgent task by using a temporary device.

The following further describes the modules of the server in the embodiment of the present application.

The data confirmation module 820 determines data related to a corresponding task and a range of the data according to task information and a data synchronization strategy that correspond to the data synchronization request.

In a possible embodiment, to efficiently determine the data related to the corresponding task and the range of the data, the data confirmation module 820 is further configured to:

determine the data corresponding to the data synchronization request by using a task-related data index.

Figure 9:
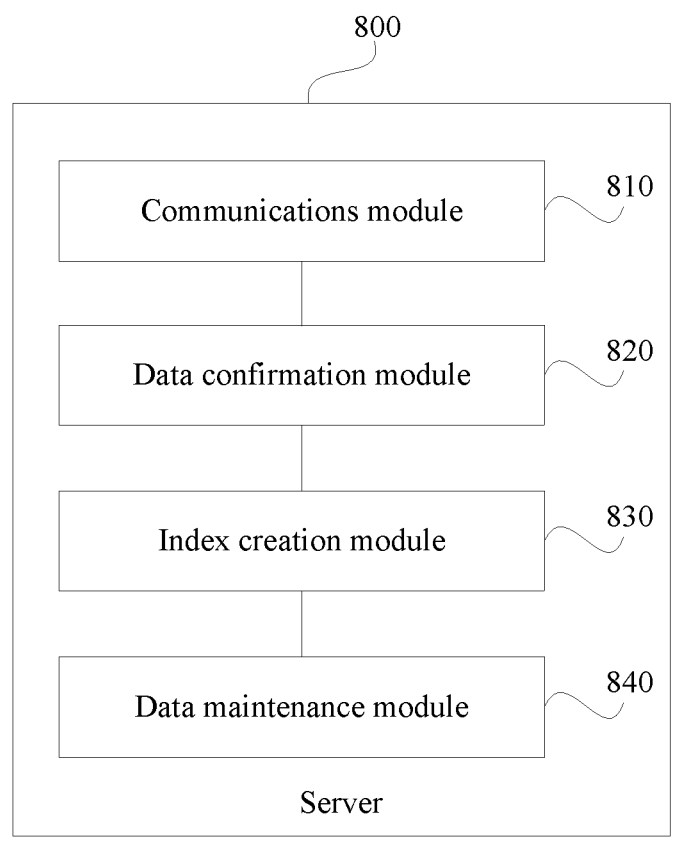
FIG. 9 is an example schematic structural diagram of another server according to an embodiment of the present application.

As shown in FIG. 9, when the task-related data index does not exist, the server 800 further comprises:

an index creation module 830, configured to create the task-related data index according to a task-related attribute of the data, for example, the index creation module 830 creates the task-related data index according to a type of the task, data attribute information of the task (for example, some time labels of the data and predefined data classification information) and the like.

In a possible embodiment, the communications module 810 is further configured to receive updated data sent by the requesting end; and the server further comprises:

a data maintenance module 840, configured to merge the updated data with local data.

In this way, data at the server end is the latest version, so that a user can acquire the data at any time. That the data maintenance module 840 performs data fusion is an existing technology, and no further details are provided herein.

In a possible embodiment, after receiving the updated data, the communications module 810 is further configured to send a confirmation notice corresponding to the updated data to the requesting end, to notify the requesting end that the updated data is received, so that the requesting end correspondingly processes local data, for example, deletes the local data or the like.

For the convenience of the user to determine the range of the data request, in a possible embodiment, the communications module 810 is further configured to send task-related synchronizable data information to the requesting end, wherein the synchronizable data information comprises: task information about all synchronizable tasks and data attribute information respectively corresponding to the all synchronizable tasks.

The synchronizable data information is described in detail in the embodiment shown in FIG. 1 and FIG. 2, and no further details are provided herein.

Figure 10:
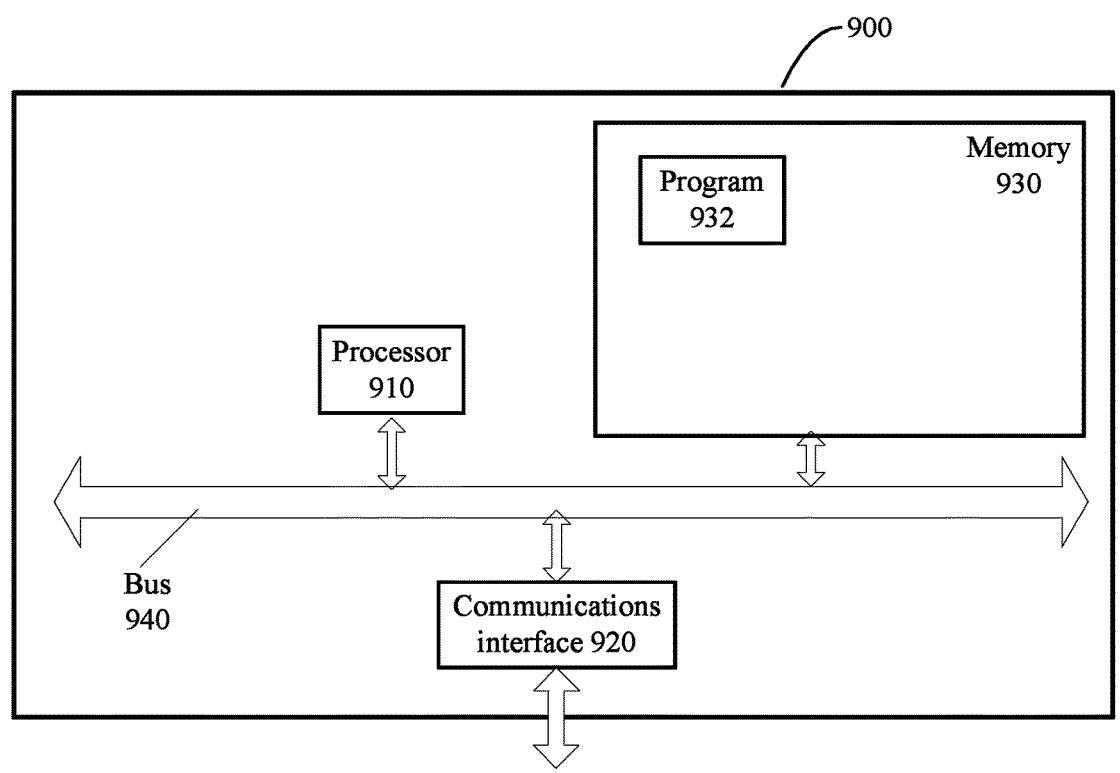
FIG. 10 is an example schematic structural diagram of still another server according to an embodiment of the present application.

FIG. 10 is a schematic structural diagram of another server 900 according to an embodiment of the present application. The specific embodiments of the present application do not limit specific implementation of the server 900. As shown in FIG. 10, the server 900 may comprise:

a processor 910, a communications interface 920, a memory 930, and a communications bus 940.

The processor 910, the communications interface 920, and the memory 930 implement mutual communication by using the communications bus 940.

The communications interface 920 is configured to communicate with a network element such as a client.

The processor 910 is configured to execute a program 932, and specifically, may implement relevant steps in the method embodiment.

Specifically, the program 932 may comprise program code, wherein the program code comprises a computer operation instruction.

The processor 910 may be a central processing unit (CPU), or an application specific integrated circuit (ASIC), or one or more integrated circuits configured to implement the embodiment of the present application.

The memory 930 is configured to store the program 932. The memory 930 may comprise a high-speed RAM memory, and may also comprise a non-volatile memory, for example, at least one magnetic disk memory. The program 932 may be specifically configured to enable the server 900 to execute the following steps:

receiving a data synchronization request related to at least one task and sent by a requesting end;

determining data corresponding to the data synchronization request; and returning the data corresponding to the data synchronization request to the requesting end.

For specific implementation of each step in the program 932, reference may be made to the corresponding description in the corresponding steps and units in the foregoing embodiments, and no further details are provided herein. A person skilled in the art may clearly understand that, for the convenience of description, for specific working procedures of the described device and module, reference may be made to the corresponding procedure description in the foregoing method embodiments, and no further details are provided herein.

Figure 11:
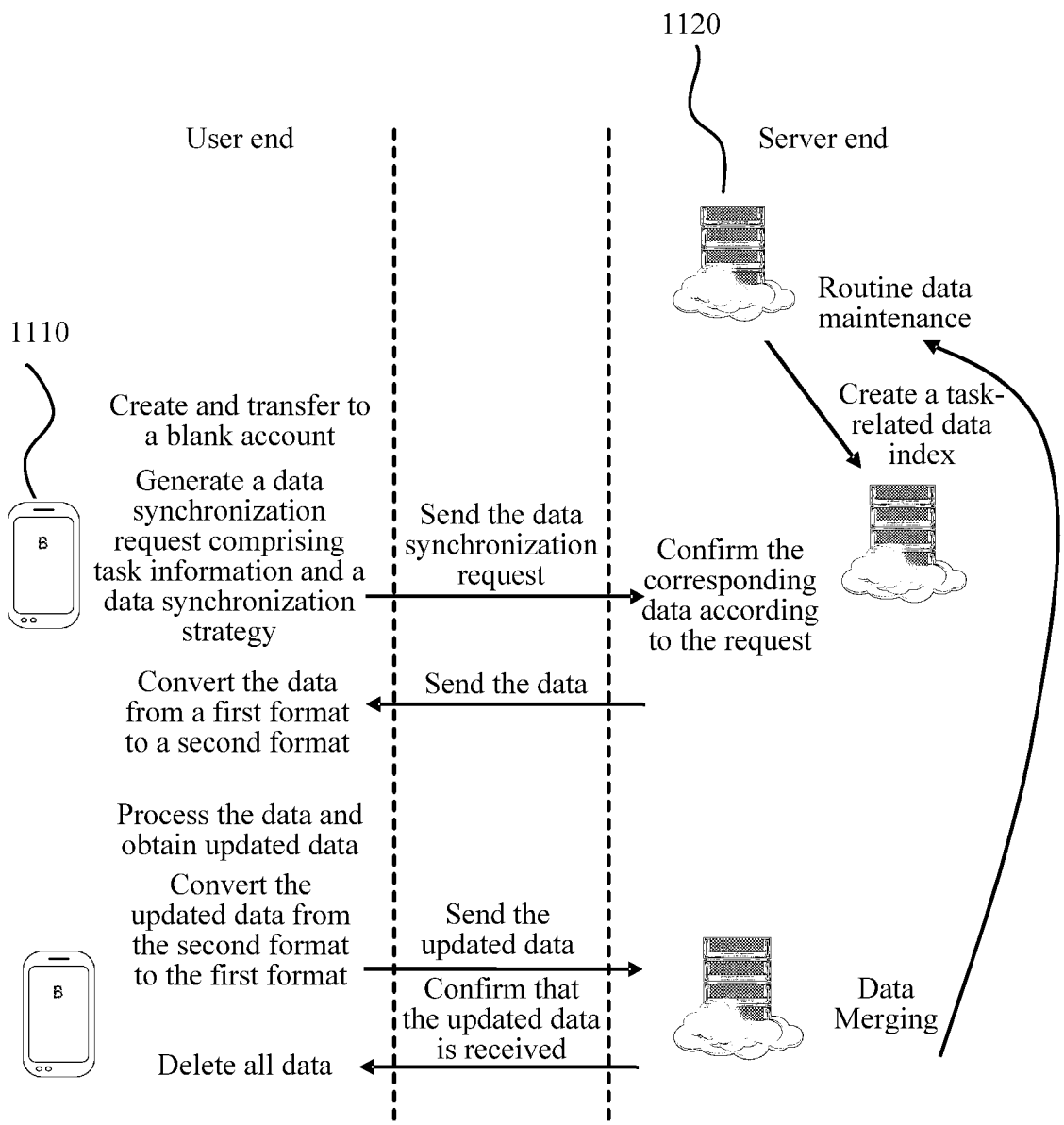
FIG. 11 is an example schematic diagram of an application scenario according to an embodiment of the present application.

FIG. 11 is a schematic diagram of an application scenario in which data transmission is performed according to the data transmission methods, a data transmission apparatus 1110, and a server 1120 in the embodiments of the present application.

As can be seen from FIG. 11, in this embodiment, the server 1120 performs routine data maintenance, and creates a task-related data index for data;

a user uses a temporary device as the data transmission apparatus 1110 (which is a mobile phone in this embodiment), in order to guarantee data security, a blank account is created, and data is transferred to the blank account, wherein the blank account comprises some applications not comprising personal data, for example, an email application;

according to a task currently to be completed, for example, according to an email sent by a contact A today, the user returns an email to the contact A, and performs a corresponding operation, so that the data transmission apparatus 1110 generates a data synchronization request related to the task and comprising task information and a data synchronization strategy, and sends the data synchronization request to the server 1120, for example, the task information is an email, and the data synchronization strategy is: requiring data of incoming and outgoing emails within three days and data of contacts in the group of colleague;

after receiving the data synchronization request, the server 1120 confirms corresponding data according to the data index and sends the data to the data transmission apparatus 1110, for example, the data transmission apparatus 1110 obtains and sends data of incoming and outgoing emails within three days and data of contacts in the group of colleague to the user end;

after receiving the data, the data transmission apparatus 1110 converts the data to a corresponding local format, and performs corresponding task processing, to obtain updated data, for example, converts the data into data in a format corresponding to the email application in the blank account, browses previous emails of the contacts and writes corresponding replies by using the email application, to obtain new data;

the data transmission apparatus 1110 converts the updated data from the local format to a generic exchange format, and sends the data to the server 1120;

after receiving the updated data, the server 1120 merges the updated data with other data of the server and sends confirmation information to the data transmission apparatus 1110, and then the server 1120 remains in a routine data maintenance status; and after receiving the confirmation information, the data transmission apparatus 1110 automatically deletes all local personal data (comprising data received from the server 1120 and data newly generated during task processing) of the blank account.

As can be seen from above, when the user needs to complete an urgent task on a temporary device that does not have personal data of the user, by using the technology in the embodiment of the present application, a user environment corresponding to the task can be quickly and flexibly virtualized, so as to complete task processing as soon as possible, which brings about convenience to the user.

A person of ordinary skill in the art may be aware that, with reference to the examples described in the embodiments disclosed in this specification, units and algorithm steps may be implemented by electronic hardware, or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present application.

When the functions are implemented in a form of a software functional unit and sold or used as an independent product, the functions may be stored in a computer-readable storage medium. Based on such an understanding, the technical solutions of the present application essentially, or the part contributing to the prior art, or a part of the technical solutions may be implemented in a form of a software product. The computer software product is stored in a storage medium, and includes several instructions for instructing a computer device (which may be a personal computer, a server, a network device, or the like) to perform all or a part of the steps of the methods described in the embodiments of the present application. The foregoing storage medium includes: any medium that can store program code, such as a USB flash drive, a removable hard disk, a read-only memory (ROM), a RAM, a magnetic disk, or an optical disc.

The foregoing embodiments are merely used for describing the present application, rather than limiting the present application. A person of ordinary skill in the art may made various changes and modifications without departing from the spirit and scope of the present application, and therefore, all equivalent technical solutions shall belong to the scope of the present application, and the protection scope of the present application shall be subject to the claims.

What is claimed is:

1. A method, comprising:
   acquiring task-related synchronizable data information, wherein the task-related synchronizable data information comprises task information about all synchronizable tasks and data attribute information respectively corresponding to all the synchronizable tasks, wherein the data attribute information comprises data classification information, wherein the data classification information is used to determine a range of to-be acquired data, and wherein the data synchronization range corresponds to a current data synchronization request of all directories;
   generating a data synchronization request related to at least one task of all the synchronizable tasks according to the task-related synchronizable data information and at least one user instruction generated through another user operation, wherein the data synchronization request comprises task information about the at least one task and a data synchronization strategy, comprising a data synchronization priority corresponding to the at least one task, corresponding to the at least one task of the synchronizable tasks;
   sending, by a device comprising a processor to a server device, the data synchronization request; and
   receiving, from the server device, data corresponding to the data synchronization request.

2. The method according to claim 1, further comprising: processing the data, to obtain updated data.

3. The method according to claim 2, further comprising: sending the updated data to the server device.

4. The method according to claim 3, wherein, before the processing the data, the method further comprises:
   converting the data from a first format to a second format.

5. The method according to claim 4, wherein, before the sending the updated data to the server device, the method further comprises:
   converting the updated data from the second format to the first format.

6. The method according to claim 1, wherein the user instruction comprises: selecting a first user instruction of the at least one task and determining a second user instruction of the data synchronization strategy corresponding to the at least one task.

7. The method according to claim 6, further comprising: deleting the data and the updated data.

8. The method according to claim 2, wherein the updated data is processed data corresponding to a related task.

9. The method according to claim 1, wherein the data attribute information further comprises data attribute information added by a user.

10. The method according to claim 9, wherein the data classification information is defined by the user.

11. The method according to claim 9, wherein the data classification information comprises one of a number of tiers into which the data classification information is classified or an attribute for classifying the data classification information.

12. A method, comprising:
   sending, by a device comprising a processor, task-related synchronizable data information to a requesting device, wherein the task-related synchronizable data information comprises task information about all synchronizable tasks and data attribute information respectively corresponding to all the synchronizable tasks, wherein the data attribute information comprises data classification information, and the data classification information is used to determine a range of to-be acquired data, and wherein the data synchronization range corresponds to a current data synchronization request of all directories;
   receiving, by the device from the requesting device, a data synchronization request related to at least one task of all the synchronizable tasks, wherein the data synchronization request is generated according to the task-related synchronizable data information and at least one user instruction generated through another user operation, and wherein the data synchronization request comprises task information about the at least one task and a data synchronization strategy, comprising a data synchronization priority corresponding to the at least one task, corresponding to the at least one task of the synchronizable tasks;

determining data corresponding to the data synchronization request, the corresponding task and the range of the data according to the synchronization strategy; and returning, to the requesting device, the data corresponding to the data synchronization request.

13. The method according to claim 12, wherein the data synchronization strategy corresponding to the at least one task comprises:

a data synchronization range corresponding to each task of the at least one task or a data synchronization priority corresponding to the at least one task.

14. The method according to claim 12, wherein the determining the data corresponding to the data synchronization request comprises:

determining, by using a task-related data index, the data corresponding to the data synchronization request.

15. The method according to claim 14, wherein, before the determining the data corresponding to the data synchronization request, the method further comprises:

creating the task-related data index according to a task-related attribute of the data.

16. The method according to claim 12, further comprising:

receiving updated data from the requesting device; and
merging the updated data with local data.

17. The method according to claim 12, further comprising:

sending the updated data to the requesting device.

18. The method according to claim 16, further comprising:

after receiving the updated data, deleting the updated data.

19. The method according to claim 16, wherein the updated data is processed data corresponding to a related task.

20. An apparatus, comprising:

a memory, coupled to a processor, that stores executable modules, the executable modules comprising:

an information acquisition module configured to acquire task-related synchronizable data information, wherein the task-related synchronizable data information comprises task information about all synchronizable tasks and data attribute information respectively corresponding to all the synchronizable tasks, wherein the data attribute information comprises data classification information, wherein the data classification information is used to determine a range of to-be acquired data, and wherein the data synchronization range corresponds to a current data synchronization request of all directories;

a request generation module configured to generate a data synchronization request related to a task of all the synchronizable tasks according to the task-related synchronizable data information and a user instruction generated through another user operation, wherein the data synchronization request comprises task information about the task and a data synchronization strategy, comprising a data synchronization priority corresponding to the task, corresponding to the task of the synchronizable tasks; and a communications module configured to send the data synchronization request to a server device, wherein the communications module is further configured to receive data corresponding to the data synchronization request from the server device.

21. The apparatus according to claim 20, wherein the executable modules further comprise:

a task processing module configured to process the data, to obtain updated data.

22. The apparatus according to claim 21, wherein the communications module is further configured to send the updated data to the server device.

23. The apparatus according to claim 22, wherein the executable modules further comprise:

a format conversion module configured to convert the data from a first format to a second format.

24. The apparatus according to claim 23, wherein the format conversion module is farther configured to convert the updated data from the second format to the first format.

25. The apparatus according to claim 20, wherein the apparatus is a mobile terminal.

26. The apparatus according to claim 23, wherein the format conversion module is further configured to convert the updated data from a local format to a generic exchange format.

27. A server, comprising:

a processor, coupled to a memory, that executes or facilitates execution of executable modules, the executable modules comprising:

a communications module configured to:

send task-related synchronizable data information to a requesting device, wherein the task-related synchronizable data information comprises task information about all synchronizable tasks and data attribute information respectively corresponding to all the synchronizable tasks, wherein the data attribute information comprises data classification information, and the data classification information is used to determine a range of to-be acquired data, wherein the data synchronization range corresponds to a current data synchronization request of all directories; and receive, from the requesting device, a data synchronization request related to a task of all the synchronizable tasks, wherein the data synchronization request is generated according to the task-related synchronizable data information and at least one user instruction generated through another user operation, and wherein the data synchronization request comprises task information about the task and a data synchronization strategy, comprising a data synchronization priority corresponding to the task, corresponding to the task of the synchronizable tasks; and a data confirmation module configured to determine data corresponding to the data synchronization request, the corresponding task and the range of the data according to the synchronization strategy, wherein the communications module is further configured to return, to the requesting device, the data corresponding to the data synchronization request.

28. The server according to claim 27, wherein the data confirmation module is further configured to:

determine, by using task-related mapping data, the data corresponding to the data synchronization request.

29. The server according to claim 28, wherein the executable modules further comprise:

an index creation module configured to create the task-related mapping data according to a task-related attribute of the data.

30. The server according to claim 27, wherein the task information is a communication, and the data synchronization strategy is a requirement for data regarding communication.

31. A computer readable storage device comprising executable instructions that, in response to execution, cause a device comprising a processor to perform operations, comprising:
- acquiring task-related synchronizable data information, wherein the task-related synchronizable data information comprises task information about all synchronizable tasks and data attribute information respectively corresponding to all the synchronizable tasks, wherein the data attribute information comprises data classification information, wherein the data classification information is used to determine a range of to-be acquired data and wherein the data synchronization range corresponds to a current data synchronization request of all directories;
- generating a data synchronization request related to at least one task of all the synchronizable tasks according to the task-related synchronizable data information and at least one user instruction generated through another user operation, wherein the data synchronization request comprises task information about the at least one task and a data synchronization strategy, comprising a data synchronization priority corresponding to the at least one task, corresponding to the at least one task of the synchronizable tasks;
- sending, to a server device, the data synchronization request; and receiving, from the server device, data corresponding to the data synchronization request.

32. The computer readable storage device of claim 31, wherein the operations further comprise:
processing the data, to obtain updated data.

33. The computer readable storage device of claim 32, wherein the operations further comprise:
sending the updated data to the server device.

34. The computer readable storage device of claim 33, wherein, before the processing the data, the operations further comprise:
converting the data from a first format to a second format.

35. The computer readable storage device of claim 34, wherein, before the sending the updated data to the server device, the operations further comprise:
converting the updated data from the second format to the first format.

36. The computer readable storage device of claim 31, wherein the determining the data corresponding to the data synchronization request comprises:
determining, by using a task-related data index, the data corresponding to the data synchronization request.

37. The computer readable storage device of claim 36, wherein, before the determining the data corresponding to the data synchronization request, the operations further comprise:
creating the task-related data index according to a task-related attribute of the data.

38. The computer readable storage device of claim 31, wherein the operations further comprise:
receiving updated data from the requesting device; and
merging the updated data with local data.

39. A computer readable storage device comprising executable instructions that, in response to execution, cause a device comprising a processor to perform operations, comprising:
- sending task-related synchronizable data information to a requesting device, wherein the task-related synchronizable data information comprises task information about all synchronizable tasks and data attribute information respectively corresponding to all the synchronizable tasks, wherein the data attribute information comprises data classification information, wherein the data classification information is used to determine a range of to-be acquired data, and wherein the data synchronization range corresponds to a current data synchronization request of all directories;
- receiving, from the requesting device, a data synchronization request related to a task of all the synchronizable tasks, wherein the data synchronization request is generated according to the task-related synchronizable data information and at least one user instruction generated through another user operation, and wherein the data synchronization request comprises task information about the task and a data synchronization strategy, comprising a data synchronization priority corresponding to the task, corresponding to the task of the synchronizable tasks;
- determining data corresponding to the data synchronization request, the corresponding task and the range of the data according to the synchronization strategy; and
- returning, to the requesting device, the data corresponding to the data synchronization request.

40. The computer readable storage device of claim 39, wherein the operations further comprise:
processing the data, to obtain updated data.

41. The computer readable storage device of claim 39, wherein the operations further comprise:
sending the updated data to the server device.

* * * * *